United States Patent [19]
Beyer

[11] 3,900,714
[45] Aug. 19, 1975

[54] HEATED TOOL FOR HEADING PLASTIC STUDS

[76] Inventor: Lewis R. Beyer, 1020 Brookpark Rd., Cleveland, Ohio 44109

[22] Filed: Oct. 17, 1973

[21] Appl. No.: 407,073

[52] U.S. Cl. ................. 219/229; 101/31; 156/579; 156/581; 156/583; 219/238; 219/243; 228/54
[51] Int. Cl. ...... H05b 1/00; B23k 3/02; B32b 31/00
[58] Field of Search ................... 219/221, 227–231, 219/236–241, 533, 243; 228/51–55; 101/21, 27, 31; 156/579, 581, 583

[56] References Cited
UNITED STATES PATENTS

| | | | |
|---|---|---|---|
| 1,904,051 | 4/1933 | Jones | 219/236 |
| 2,116,562 | 5/1938 | Cruser | 219/229 |
| 2,468,818 | 5/1949 | Fox et al. | 219/239 |
| 2,507,736 | 5/1950 | Ritchie et al. | 219/240 |
| 2,609,316 | 9/1952 | Fichtner | 219/227 X |
| 3,435,188 | 3/1969 | Collard | 219/237 |
| 3,770,183 | 11/1973 | Vanyi | 219/229 X |

*Primary Examiner*—A. Bartis
*Attorney, Agent, or Firm*—Watts, Hoffmann, Fisher & Heinke

[57] ABSTRACT

A tool for applying heat to a heat-malleable workpiece, constructed to automatically cycle the temperature of a heat-applying portion of the tool in use. The tool includes a heater of substantially constant output, a heat-conductive forming die, and a heat conduit connecting the die to the heater. A portion of the heat conduit adjacent the die is more restrictive to heat transmission than is the die, yet is capable of transmitting heat faster than the die radiates to the ambient atmosphere. In use, the temperature of the die portion will be rapidly diminished during a shaping operation to permit removal from the shaped workpiece without sticking and will then be automatically reheated to a forming temperature by heat conducted through the restrictive portion.

6 Claims, 7 Drawing Figures

PATENTED AUG 19 1975  3,900,714

HEATED TOOL FOR HEADING PLASTIC STUDS

BACKGROUND OF THE INVENTION

This invention relates to a tool for heating and forming thermoplastic materials, and more particularly for forming ends of plastic studs.

Plastic studs adapted to pass through an aperture of one member to connect it to another, and typically utilizing a headed end, are useful as fasteners. As disclosed in the copending application of Lewis R. Beyer, Ser. No. 299,302, filed Oct. 20, 1972, entitled Loose Leaf Binder Construction, now U.S. Pat. No. 3,809,485 a plastic backbone for a ring binder is provided with plastic studs that replace the rivets previously used to hold a ring member in a loose-leaf binder cover. To prevent removal of the ring member, it is desirable to thermo-form the ends of the studs to form a retaining head over which the ring member cannot pass. This can be done with a heated die of desirable concave shape. At the temperatures necessary for thermo-forming, the plastic of which the studs are formed will stick to the die, when the die is removed. Thus, as in other plastic molding operations, it is necessary to cycle the temperature of the forming die, so that the die is cooled before it is removed from the plastic stud.

Cycling of the forming die temperature could be accomplished with a suitable control, such as a timer for automatic operation or a switch for manual operation, but that approach is unacceptable from the cost standpoint and because of the need to modify ordinary type heating instruments, such as conventional soldering iron heaters or the like, that are otherwise already available. Further, present industry concepts of asembling ring members in binder covers are based on the use of inexpensive hand tools. Specifically, the present practice is to use metal rivets to hold the ring members, and to peen the rivet ends with a punch and hammer.

SUMMARY OF THE INVENTION

The present invention is a tool for applying heat to a heat-malleable workpiece, constructed to automatically cycle the temperature of a heat-applying portion of the tool in use. The tool includes a heater of substantially constant output, a heat-conductive forming die, and a heat conduit connecting the die to the heater. A portion of the heat conduit adjacent the die is more restrictive to heat transmission than is the die, yet is capable of transmitting heat faster than the die radiates to the ambient atmosphere.

In use, heat is conducted from the heater, such as the heating element of a soldering iron, through the heat conduit to the shank or body portion and thence through the restrictive portion to the die. Prior to forming a workpiece, e.g., the end of a plastic stud, the tool attains a uniform temperature above the forming temperature of the workpiece material. The die is applied to the workpiece, softening and shaping it. In doing so, the die is cooled. In particular, in shaping the end of a plastic stud to retain a metal ring member to the backbone of a binder cover, the die at the conclusion of the shaping comes in contact with the metal ring member which rapidly carries away heat from the die portion of the tool. Heat flow to the die being restricted, the die portion cools, allowing removal from the stud without sticking to the plastic material. Once the die is removed, it reheats to a temperature approximately that of the heater and conduit due to the constant input of heat from the heat element at a rate greater than that at which heat radiates from the die.

It is an object of this invention to provide an inexpensive tool that will automatically cycle the temperature of a working portion during use, while utilizing a constant heat input. It is a further object to provide such a tool that, with a constant heat source and with a heat flow restriction, will quickly and automatically cycle the temperature of a shaping die portion through a temperature range at the upper end of which plastic will be softened and molded and at the lower end of which separation between the die and plastic can be accomplished without sticking. Other objects, features and advantages of the invention will become better understood from the detailed description that follows, when considered in connection with the accompanying drawings.

Detailed Description of Preferred Embodiments

Figure 1:
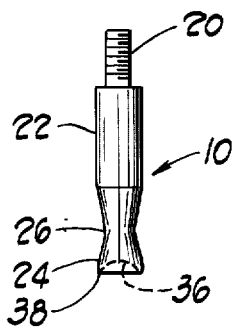
FIG. 1 is an elevational view of a tool tip embodying the present invention.

With reference to the drawings, a tool 8 (FIG. 3) embodying the present invention is shown, useful for heating and forming the end of a plastic stud. The tool 8 includes a tool tip 10, best shown in FIGS. 1 and 2, and a heater 12, which may be part of a conventional hand soldering iron 13. The tool is used to form the ends of a plastic stud 14 of a loose-leaf binder cover 16, to attach a metal ring member 18.

The tool tip 10 is of generally elongated shape, of one piece conductive material, and is suitably attachable to the heater by a threaded attachment screw 20. The tool tip 10 acts as a heat conduit and is comprised of three portions, a shank portion 22, a die portion 24, and an intermediate portion 26 between and of smaller cross sectional area than the two portions 22, 24.

The shank portion 22 is used to receive the attachment screw 20 for securing the tool tip to the heater and for receiving and conducting heat from the heater. For heat conductive purposes, the shank portion 22 is of relatively large cross section and provides substantial surface contact with the heater 12. This contact is provided through a threaded hole 28 formed in one end 30 of the tool tip and extending axially, for receiving the screw 20, and by the flat surface of the end 30, which abuts a similar surface 32 of the heater 12. The screw 20 is received in a threaded hole 34 of the heater to firmly connect the tool tip 10, with the surfaces 30, 32 in heat transfer contact. Thus, heat is transmitted from the heater 12 to the tool tip 10 throughout essentially the entire cross sectional area of the shank portion.

The die portion 24 serves to heat and shape the workpiece, such as the plastic stud 14. To that end, a cavity 36 is provided in the end of the die portion of the tool tip, large enough to receive the end of the stud 14 and of a shape desired of the stud after forming. The mass of the die portion 24 serves as a heat reservoir, being large enough to hold heat sufficient to melt the plastic stud end. In the preferred embodiment, the shank portion 22 is larger than the die portion and also serves as a heat reservoir to supply heat to the die portion. A rim 38 surrounding the cavity 36 of the die portion is adapted to contact the part through which the stud extends, i.e., the metal ring member 18 after the stud is shaped, so that the heat of the die portion 24 will be rapidly conducted away. The size of the die portion 24 is small enough that the time required to conduct away residual heat, sufficient to lower the temperature of the die portion below the softening temperature of the thermoplastic stud, is short.

The smaller cross sectional intermediate portion 26 of the tool tip serves to limit the rate of heat flow or transfer from the shank portion 22 to the die portion 24. The reduced cross sectional area is selected to retard the heat flow to a rate significantly less than that at which heat is extracted from the die portion 24, to assure that the die portion will cool after the stud has been softened and formed. Thus, the restricted portion 26 prevents heats from flowing from the heater and shank 22 to the die 24 at a rate comparable to that at which heat is being carried from the die portion 24 by the workpiece and metal ring member 18. On the other hand, the cross sectional area of the restricted portion 26 is large enough that the die portion 24 will reheat within a short period of time after the tool is removed from the stud and ring member 18, in preparation for the next forming operation. Thus, the portion 26 is capable of conducting heat to the die at a significantly greater rate than the die radiates the heat to the ambient atmosphere.

Advantageously the tool 10 is made of a material hard enough to take the wear to which it is subjected during use, and to resist deformation when applying pressure to the stud and ring member 18. Yet, it must be highly conductive, enough so that within the cross sectional area available, compatible with the dimensions established by the die shape required, the tool will conduct sufficient heat that it can be reheated efficiently subsequent to a molding operation. A preferred material meeting these criteria is beryllium. Further, to minimize any tendency of sticking between the tool and plastic, and thereby permit removal of the tool from the plastic more quickly than otherwise, a release agent, such as a coating of Teflon, is provided on the surface of the cavity 36.

Figure 2:
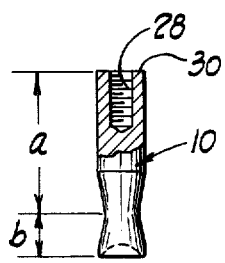
FIG. 2 is a view, partly in elevation and partly in section of the tool tip of FIG. 1, showing the manner in which a threaded attachment member is received.

By way of example, in a preferred embodiment of the invention shown in FIGS. 1 and 2, the tool 10, excluding the screw 20 has a total length of 1.2 inches. The shank portion 22, including the tapered portion terminating at the minimum cross section portion 26 (indicated at $a$ in FIG. 2), is 1.0 inch in length, and the die portion 24 from the area of minimum cross section at 26 to the rim 38 (indicated at $b$ in FIG. 2), is 0.2 inch in length. The maximum diameter of both the shank portion 22 and the die portion 24 is 0.3 inch. The diameter of the tool tip at the minimum cross sectional area 26, is one-half the diameter of the shank and die portions; hence, the cross sectional area at 26 is one-fourth that of the shank and die.

Figure 3:
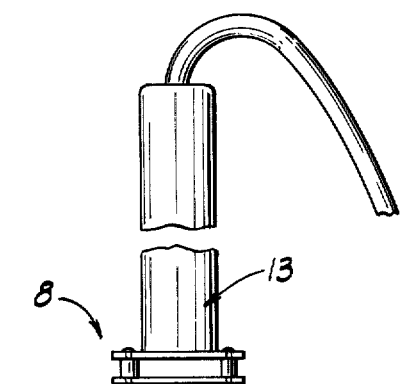
FIG. 3 is a view partly in elevation and partly in section of a heating tool to which the tool tips of FIGS. 1 and 2 are attached, illustrating an initial relationship between the tool and a stud to be formed to connect a ring member to a loose-leaf binder.
Figure 4:
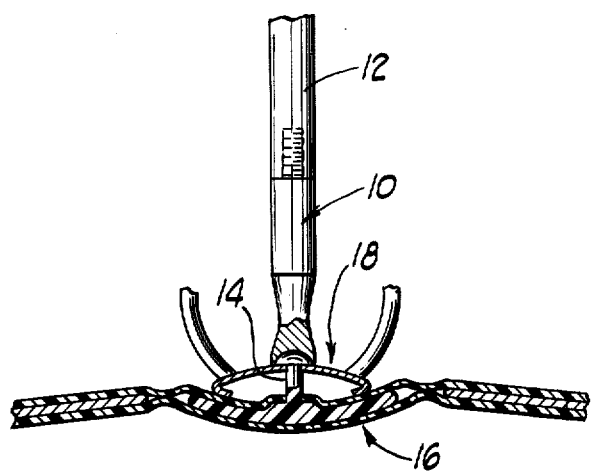
FIG. 4 is a view partly in elevation and partly in section similar to FIG. 3, illustrating a final position in the forming of the stud.
Figure 5:
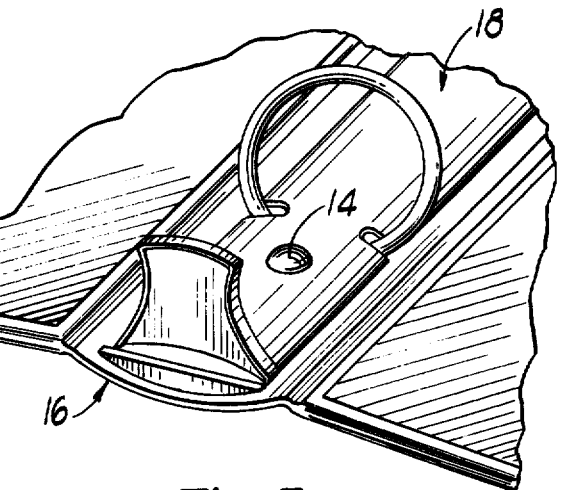
FIG. 5 is a partial perspective view, showing the stud as finally formed.

The operation of the tool 8 in forming the head of a stud 14 is illustrated in FIGS. 3 and 4. A ring member 18 has been pressed onto the studs 14 of a ring member 18. For this purpose, the ring member 18 has holes spaced an appropriate distance corresponding to the spacing between studs 14, two of which are typically provided, but only one of which is shown in the drawings. The construction of the studs is shown in more detail in the aforementioned copending application. The heater 12 is operated from electrical energy and heat is transferred to the attached tool 10 through the screw 20 and the face-to-face contact between the surfaces 32 and 30. A 25 watt soldering iron will raise the temperature of the tool tip 10 to a sufficient level at which it will soften such thermoplastic materials as polyethylene, polypropylene, and the like, of which the stud 14 is typically made. The stud 14 may have an enlarged end, with a slot in it, as shown in the aforementioned copending application, or could have a head of other construction, or alternatively may initially be unheaded. The shape of the cavity 36 is compatible with the initial shape and size of the stud and determines the final shape, which is shown in FIG. 5. The tool tip 10 is placed with the cavity 36 against the end of the stud 14 and pressure is applied against the stud while the heat of the die portion 24 softens the plastic material. The pressure then molds the end of the stud 14 to the shape of the cavity 36 as the tool is pressed against the end of the stud, finally reaching the position shown in FIG. 4, in which the rim 38 contacts the metal of the ring member 18. The die portion 24, which has already transferred substantial heat to the plastic stud 14, now undergoes a rapid heat loss as the greater conductivity of the ring member 18 acts as a heat sink, conducting away the heat from the die portion 24 of the tool 10. This heat is carried away at a rate more rapid than heat can be transferred from the shank 10 through the restrictive portion 26 of the tool. As a result, the die portion 24 is reduced in temperature and the end of the plastic stud 14 cools to a temperature below that at which it will stick to the die. At that point, the tool tip 10 is removed from the stud. Because the conduction of heat from the die portion 24 to the surrounding air is relatively low, the heat flow to the die portion through the restriction 26 is now greater than the rate of heat loss and the temperature of the die portion rapidly rises to that of the shank portion 22, preparatory to a subsequent forming operation.

Figure 6:
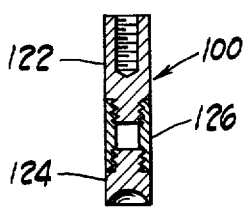
FIG. 6 is a longitudinal sectional view of a second embodiment of a tool tip embodying the present invention.

A second embodiment of the invention is shown in FIG. 6. A tool tip 100 is shown with a shank portion 122 and a die portion 124 corresponding respectively with the shank 22 and die 24 of the tool tip 10. This tool tip 100 is of constant diameter, but the portion between the shank 122 and die portion 124 is formed of a tubular member 126 to which the shank portion 122 and die portion 124 are threaded at opposite ends. These three parts are preferably of conductive material, such as metal, but need not all be of the same material. For example, while the die portion 124 should be both conductive and hard, and will suitably be formed of beryllium, the parts 122 and 126 need not withstand the wear to which the die part is subjected, and hence could be of a softer material, such as brass. The thickness of the tubular wall 126 is selected to provide the desired cross sectional area, comparable to the cross sectional area of the restricted portion 26 of the tool tip 10.

Figure 7:
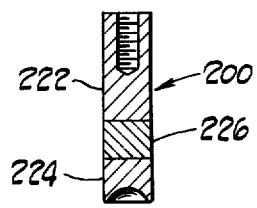
FIG. 7 is a longitudinal sectional view of a third embodiment of a tool tip embodying the invention.

A third embodiment of the invention is shown in FIG. 7. A tool tip 200 of constant diameter is formed of three parts, a shank part 222, a die part 224, corresponding respectively with the shank portion 22 and the die portion 24 of the tool tip 10. These two parts are connected by an intermediate part 226. The parts 222 and 224 are of relatively high heat conductivity, and the part 226 is of significantly lower heat conductivity. Thus, by a selection of appropriate metals or alloys, the part 226 can be selected of a conductivity comparable to that of the tubular part 126 or of the reduced cross sectional portion 26 of the tool 10. The parts 222 and 224 can be of relatively high conductivity, such as berilium, or as in the tool 100, the shank portion can be of a softer but highly conductive material, such as brass. The parts 222 and 224 are secured to the part 226, as by brazing, or welding, or with an industrial adhesive.

While preferred embodiments of the invention have been described in detail, it will be appreciated that various modifications or alterations may be made therein without departing from the spirit and scope of the invention, set forth in the appended claims.

What is claimed is:

1. A tool for heading a plastic stud against a heat-conductive element, comprising a heater, heat-conductive forming means including a concave head-forming surface for heating and forming an end of a plastic stud, and a thermally conductive heat conduit connecting said forming means to said heater, said forming means further including surface portion means for contacting a heat-conductive element against which the plastic stud is formed, and said heat conduit including a portion closely adjacent said forming means more restrictive to heat transmission than the forming means, said portion being capable of transmitting heat to said forming means faster than the forming means radiates heat away to ambient atmosphere but slower than the heat conductive element and stud conduct away heat from said forming means.

2. A tool as set forth in claim 1 wherein said portion adjacent said forming means is of lesser mass than the forming means.

3. A tool as set forth in claim 2 wherein said portion adjacent said forming means is of smaller cross sectional area than the forming means.

4. A tool as set forth in claim 2 wherein said portion adjacent said forming means is also of lesser mass than a part of the heat conduit between said portion and the heater.

5. A tool as set forth in claim 1 wherein said portion adjacent said forming means is of a material having lower thermoconductivity than the forming means.

6. A combination forming die and heat conduit tool for heading plastic studs, comprising a first portion including means for connecting the tool to a heater, a second portion including heat-conductive forming means having a concave head-forming surface for heating and forming an end of a plastic stud and a peripheral surface portion for contacting a heat-conductive element against which a plastic stud is headed, and means intermediate the first and second portions more restrictive to heat transmission than either of said first and second portion for limiting the rate of heat flow from the first portion to the second portion, said intermediate means being capable of transmitting heat to said second portion faster than said second portion radiates heat away to the am ambient atmosphere but slower than the heat conductive element and stud conduct heat away from said forming means, whereby when said tool is heated at said first portion with a constant heat input to a suitable forming temperature and used to head a stud, the second portion will cool from conduction of heat to the stud and element against which the stud is headed at a significantly faster rate than heat will be supplied through said intermediate means, and will reheat upon removal from said stud and element.

* * * * *